United States Patent [19]

McComas

[11] 4,060,805
[45] Nov. 29, 1977

[54] INTEGRATED TERMINAL AREA SURVEILLANCE SYSTEM

[75] Inventor: Arthur D. McComas, Cockeysville, Md.

[73] Assignee: The Bendix Corporation, Southfield, Mich.

[21] Appl. No.: 700,433

[22] Filed: June 28, 1976

[51] Int. Cl.² .............................................. G01S 9/56
[52] U.S. Cl. ........................ 343/6.5 LC; 343/112 TC
[58] Field of Search ........ 343/6.5 R, 6.5 LC, 112 TC

[56] References Cited

U.S. PATENT DOCUMENTS

| | | | |
|---|---|---|---|
| 3,665,464 | 5/1972 | Meilander | 343/112 TC X |
| 3,766,552 | 10/1973 | Hajduk | 343/6.5 R X |
| 3,775,767 | 11/1973 | Fielding | 343/112 TC X |
| 3,900,846 | 8/1975 | Gibbon et al. | 343/112 TC X |

*Primary Examiner*—T.H. Tubbesing

*Attorney, Agent, or Firm*—W. G. Christoforo; Bruce L. Lamb

[57] ABSTRACT

An integrated airport terminal area surveillance system, including a plurality of spaced apart interrogating and receiving stations and central equipment for controlling the stations operates in search and track modes by transmitting interrogation messages and receiving resulting replies. In the search mode the stations interrogate by directional beams all aircraft operating within the entire terminal area and enrolling the position and identification of replying aircraft into a system memory. In the track mode those aircraft enrolled in the system memory are individually interrogated. A system map is divided into memory cells corresponding to predetermined geographical cells. The means by which an aircraft is interrogated is determined by the geographical cell in which the aircraft is located.

7 Claims, 13 Drawing Figures

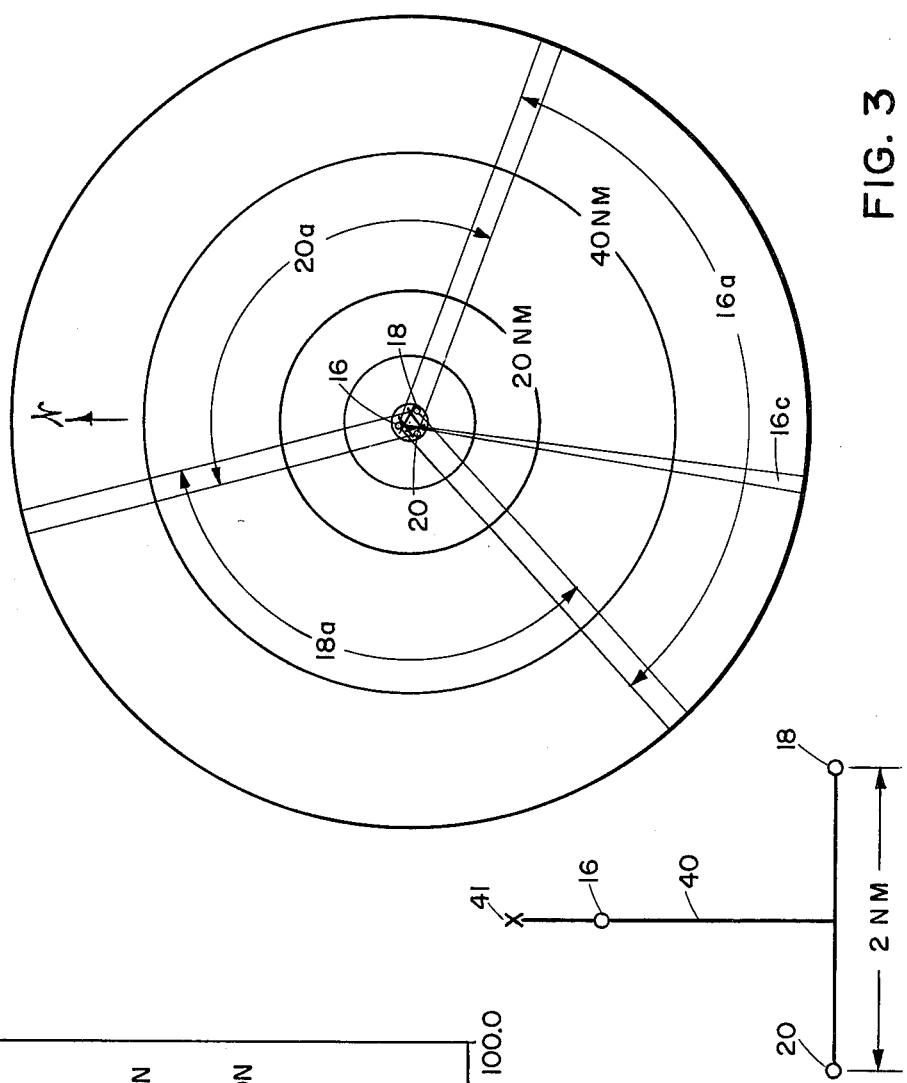
FIG. 3
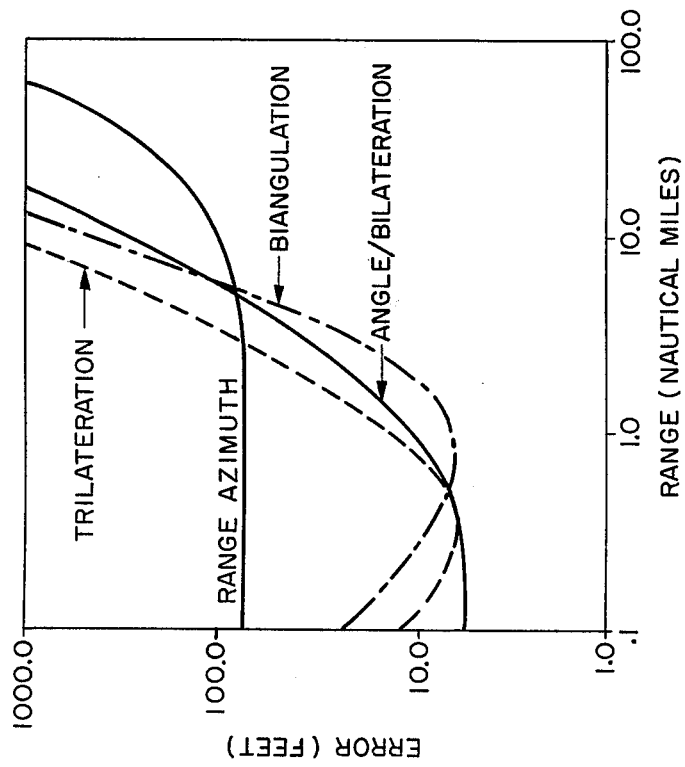
FIG. 2a
FIG. 2

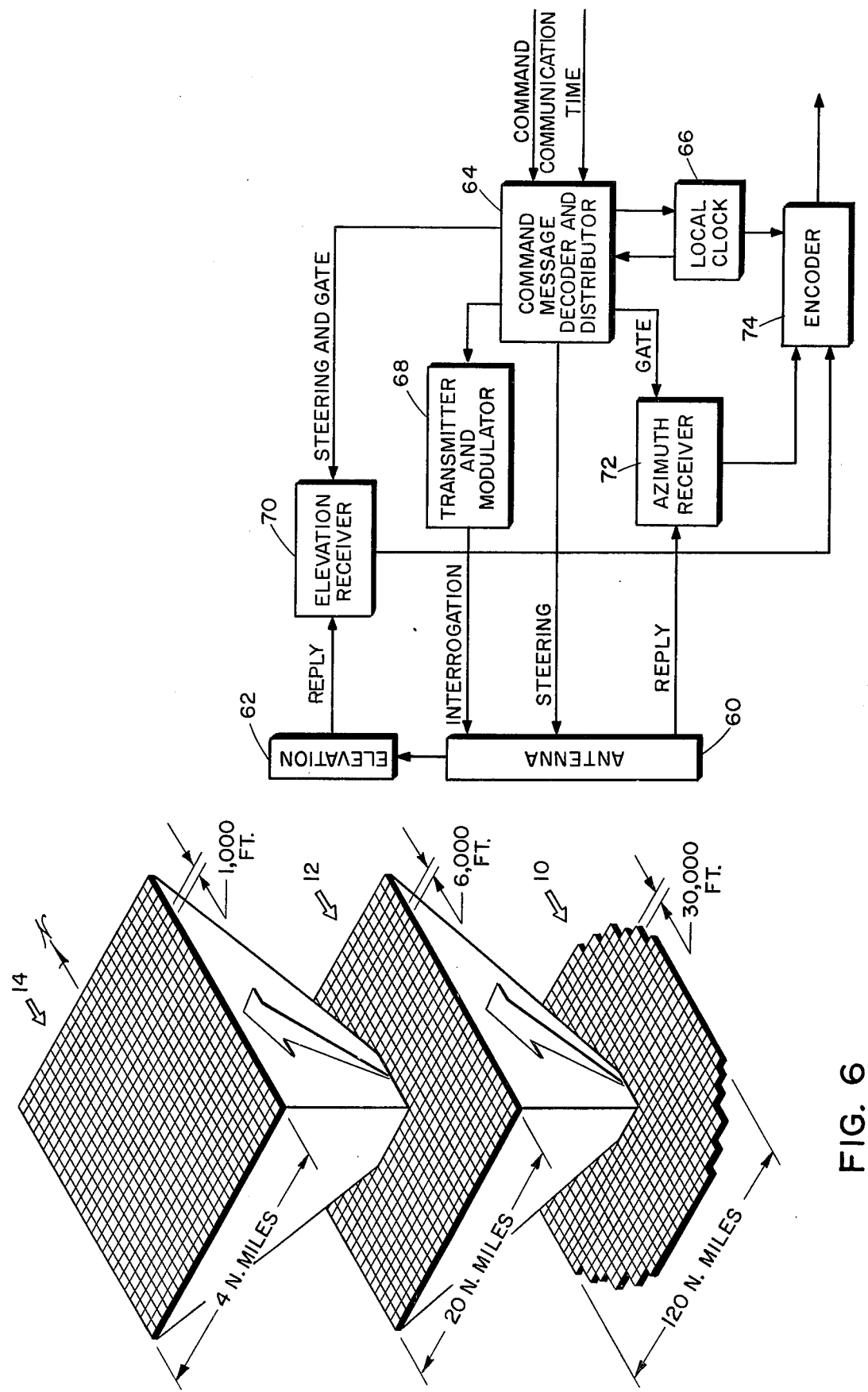

RANGE AND AZIMUTH

BIANGULATION

TRILATERATION

ANGLE/BILATERATION

ND SYSTEM

BACKGROUND OF INVENTION

This invention relates to means for determining the location of aircraft traffic and particularly to the use of standard air traffic control (ATC) transponders to determine the position of aircraft within the terminal control area to a degree of accuracy heretofore not realizable.

There has been disclosed in U.S. Pat. No. 3,870,994 a means for interrogating an ATC transponder located in a small geographical area within a larger field of interest, to the exclusion of other ATC transponders within the field of interest, by transmitting, from a first interrogation station, a message which suppresses all transponders within the field of interest except for transponders which lie inside a narrow beam having its origin at the first station, and thereafter transmitting a standard air traffic control radar beacon system (ATCRBS) message from a second, spaced apart, station. As known to those skilled in the art, the standard ATCRBS message is transmitted by radiating an interrogation message along a narrow beam from the transmitting station. As known to those skilled in the art the interrogation message is adapted to suppress all transponders outside the above mentioned narrow beam from the second station. Thus, a transponder located at the intersection of the beams from the first and second stations will be the only transponder within the field of interest which is not suppressed and which also receives the interrogation message. It will thus be the only transponder within the field of interest which will respond. If the transponder is located on a grounded aircraft, such as an aircraft taxiing at an airport, then the response will provide the aircraft identification. The state of the art is such that this response is easily obtainable.

Geographic addressing by interrogation means as described above is of most utility at close ranges to the interrogation stations due to the relatively long base line between stations as compared to the range of the transponders being interrogated. The aforementioned means is particularly adapted for addressing transponders in aircraft on the ground or in the nearby vicinity of an airport.

The airport terminal control area (TCA), which includes the airport surface and the airspace around the airport out to about a 60 mile range, has long been considered a key problem area in the control of air traffic. The TCA is characterized by converging and increasing air traffic as a function of distance from the airport. Many of the aircraft control problems in the TCA are traceable to the operational limitations imposed by the currently operational surveillance system which is essentially uniform and marginally adequate in its accuracy and resolution capabilities over the entire TCA. Other problems result from actual gaps and voids in coverage, the constraint imposed by presently operational uniformly rotating mechanical antennas which interrogate each aircraft at four second intervals regardless of aircraft position and the general mismatch between real aircraft traffic control needs and the basic performance limitations of existing operation beacon interrogators comprising the present aircraft surveillance system.

SUMMARY OF THE INVENTION

The present invention is an improvement to the invention described in the aforementioned U.S. Pat. No. 3,870,994 and which provides for accurately locating aircraft through geographic addressing by interrogation of transponder equipped aircraft not only on the airport surface but also for accurately locating aircraft throughout the entire airspace in the vicinity of the airport operational areas. It will be shown how to identify and locate aircraft to a closer accuracy than normally possible. Briefly, this will be done by dividing the airport operational areas into relatively small geographical cells for control purposes and precalculating for each geographical cell the most accurate means of selectively interrogating and then measuring the position of aircraft transponders located within that geographical cell. Thereafter, aircraft entering the field of interest will be tracked through the various geographical cells and their locations determined by the most accurate method available. The above is accomplished by providing a memory having a plurality of memory cells, each of said memory cells being preassigned to a particular one of the geographical cells, with the memory being programmed so that each memory cell includes information related to instructions as to how the system to be further described is to determine the location of an aircraft located within the particular geographic cell. The system of the invention, which is an integrated airport terminal area surveillance system, additionally comprises central control equipment which directs the operation of a plurality of spaced apart interrogating and receiving stations. The stations are routinely directed to search the airport terminal control area by means of standard air traffic control interrogations so as to elicit responses from all aircraft operating within the TCA. A further system memory is also provided wherein all aircraft operating in the TCA are normally listed. An aircraft responding to a search interrogation and not previously listed in the system memory is thereupon listed or enrolled therein according to its location within the TCA. Thereafter, aircraft listed in the system memory are tracked as they maneuver through the TCA by means which automatically inspect the system memory and direct the stations to interrogate the aircraft listed therein in accordance with the need to update the location information of the aircraft. When the system determines that the location of an aircraft is to be updated, the location of the aircraft as listed in the system memory is used to instruct the stations as to the direction in which the interrogation is to be made and simultaneously the location information is used to address the appropriate cell of the map memory for extracting the information therein. This information will include instructions as to which station or stations are to perform the interrogation and what method is to be used to determine the aircraft's new location.

As will become clear as the description of the invention proceeds, the layout and configuration of a particular surveillance system built in accordance with the principles of the invention at any specific airport must of necessity be developed in response to the requirements, problems and constraints of that particular airport. This dictates an interactive planning and siting process which recognizes site dependent factors such as initial performance requirements, airport layout, locations of radio obstructions, airport size, real estate availability and accessibility, growth requirements, etc. In order to aid in an understanding of the invention, an idealized conceptual system configuration is provided below. In reading the description of the preferred embodiment of the invention the reader should note that any system configuration and method according to the invention at a real airport will be somewhat different from the system and method described due to site dependent factors but that the invention has inherent flexibility to adapt to the constraints to any given TCA and will provide a satisfactory level of surveillance services.

BRIEF DESCRIPTION OF THE DRAWINGS

FIG. 2 is a graph which shows a comparison of the accuracies of four methods of determining the position of responding transponders with respect to their range from the stations for the station arrangement of FIG. 2a.

FIG. 3 shows a terminal control area in plan view together with three stations and illustrates the preferred method of performing a search through the entire TCA.

FIG. 6, like FIG. 1, shows the TCA in stylized form with the various sections of the TCA divided into illustrative geographical cells.

FIG. 7 is a block diagram of a typical station.

DESCRIPTION OF THE PREFERRED EMBODIMENT

Figure 1:
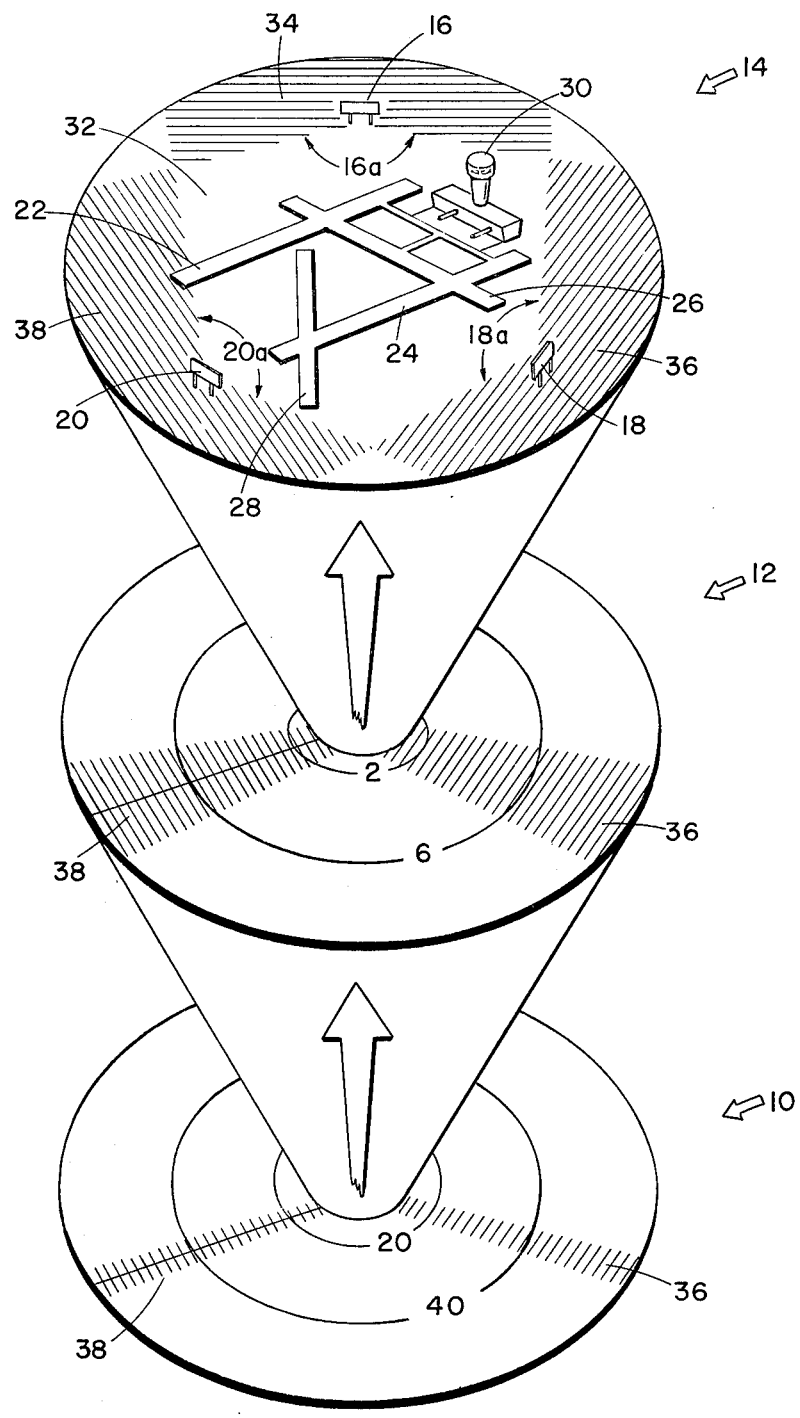
FIG. 1 shows a terminal control area, stylized for clarity and including the airport surface area in detail together with three stations.

Refer first to FIG. 1 where the terminal control area (TCA) of this embodiment is shown to a range of 60 miles. Specifically, the TCA airspace, which is defined for the purposes of this description as the volume of airspace lying between 10 and 60 miles from the airport, is shown at 10 as being bounded by circles having radii of 60 miles and 10 miles, respectively. A TCA approach zone 12, which is defined as the volume lying between 1.5 and 10 miles from the airport, is seen expanded with respect to airspace 10. The airport surface 14 is arbitrarily defined as lying within a 1.5 radius from the center of the airport, and is seen further expanded.

Airport surface 14 in this embodiment includes three equally spaced stations 16, 18 and 20, which comprise the transmitting and receiving stations of this embodiment of the invention and which lie about the periphery of the airport runway/taxiway ramp network comprising parallel runways 22 and 24, perpendicular runway 26, oblique runway 28 and control tower 30.

Each station is assumed to be able to transmit both an interrogation and a suppression signal of the type to be described below. Additionally, each station is assumed to include an electronically steerable phased array transmitting and receiving antenna for transmitting the aforementioned signals and receiving responses from interrogated transponders. The effective field of interest of each station, wherein an aircraft within the field of interest can be interrogated or illuminated from the station, is assumed to comprise an area encompassed by an angle of 128° and the airspace thereabove, for example, angle 16a for station 16, angle 18a for station 18 and angle 20a for station 20. There is thus a central area 32 which can be illuminated by all of the stations. There are also areas 34, 36 and 38, shown here hatched, which can be illuminated by two stations. Note that these areas of two station coverage extend into approach area 12 and airspace 10.

As previously mentioned, each station can transmit an interrogation signal which is simply the standard air traffic control (ATC) interrogation message. This standard interrogation message consists of a two pulse interrogation code, termed in the art pulses $P_1$ and $P_3$, the spacing between pulses determining the particular response or reply mode requested from an interrogated aircraft. These two pulses are transmitted directionally in a narrow steerable beam, positioned azimuthally by electronically steerable techniques in the present preferred embodiment. Another pulse, termed in the art the $P_2$ pulse, is inserted 2 microseconds after the first pulse ($P_1$) and before pulse $P_3$ and is transmitted omnidirectionally or by means of a directional beam with a notch or null lying in the same direction as the narrow beam used to transmit $P_1$ and $P_3$. It is used, as known in the art, to suppress transponders located outside of the selected direction from the interrogation station. Specifically, pulses $P_1$ and $P_3$ are observed by transponders within the narrow beam at a higher amplitude than pulse $P_2$, which situation is interpreted by the transponder as an interrogation. On the other hand, pulse $P_2$ is observed at a higher amplitude outside of the desired direction than pulses $P_1$ and $P_3$, which fact is interpreted by the transponder so as to suppress the transponder. Transponders are designed to maintain suppression for 35 ± 10 microseconds during which time a suppressed transponder will not respond to a subsequent interrogation. The interrogation message is thus comprised of pulses $P_1$, $P_2$ and $P_3$ wherein pulses $P_1$ and $P_3$ are received by transponders within the narrow beam at a higher amplitude than pulse $P_2$, thus eliciting a response from the illuminated transponder so long as it is not suppressed, and wherein the interrogation message suppresses for the above mentioned period all transponders lying outside the narrow beam.

A second message, herein termed the suppression message, is identical to the interrogation message except that the last pulse is not transmitted. In that case pulses $P_1$ and $P_2$ are transmitted from a station over the entire field of interest except along a narrow beam, thus suppressing all transponders within the field of interest except for those within the beam. However, transponders within the beam do not respond at that time but neither are they suppressed. Thus, if within the subsequent suppression period thereafter the field of interest is illuminated by an interrogation message from a second, spaced apart station, only transponders located at the intersection of the two beams, one from each station, will respond. In this manner, a predetermined small geographical area within surface area 14 can be individually addressed as was taught in aforementioned U.S. Pat. No. 3,870,994. Of course, only those sections of the TCA which can be illuminated by two stations can be addressed in this manner. In this embodiment such sections of the TCA include sections 32, 34, 36 and 38.

Each station includes a direction measuring receiver and a clock which is synchronized with clocks at the other stations. Thus, by considering the receiving angles of any two antennas, the location of the responding transponder can be determined by biangulation. Location of the responding transponder can also be determined by trilateration, when three stations receive the response, by considering the time of arrival of the response at the various stations. A single station can determine the position of a responding transponder by considering the angle from which the response is received at the station and obtaining range from the elapsed time between the transmission of the interrogation and reception of the resulting response. Of course, as might be expected, this last scheme results in rather large position errors for transponders located close to the station. However, as will be explained below, this last scheme results in a relatively small position error, with respect to the error inherent in other schemes, for transponders located far from the station, such as transponders in airspace 10 or approach area 12. Another scheme is to determine the range between the responding transponder and each of two receiving stations and the azimuth (or angle) from one of the stations to the transponder. This scheme is known as the angle/bilateration method.

FIG. 2 is a graph which shows a comparison of four methods of determining responding transponder position, range/azimuth, trilateration, biangulation and angle/bilateration. FIG. 2 is prepared for the special case where the transponder equipped target, for example, target 41, is located on a line 40 (FIG. 2a) which extends from the center of a 2 nautical mile long base line connecting two of the stations 20 and 18 and out over the third station 16 into the approach area 12 and airspace 10. From FIG. 2 it can be seen that the angle/bilateration method provides the best position accuracy at ranges up to about 0.75 miles, the biangulation scheme provides the best accuracy from 0.75 miles to about 8 miles, and that the range azimuth scheme provides best accuracy from 8 miles out. Particularly note that at extended ranges the range/azimuth scheme provides the best measure of transponder position. This is especially important since most of these extended ranges are visible to only one of the interrogation stations. It should be obvious the curves similar to those of FIG. 2 can be constructed for all potential transponder positions and any form of station siting.

Figure 8:
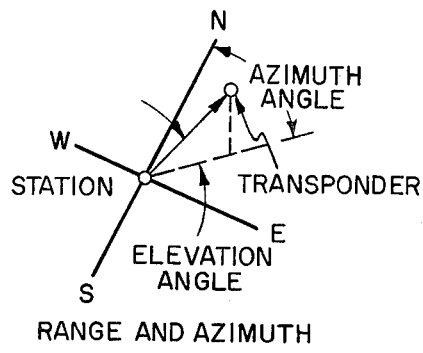
FIGS. 8, 9, 10 and 11 illustrate the geometry of various methods for determining the location of aircraft within the TCA.
Figure 9:
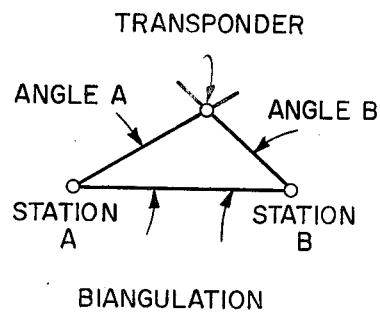
Figure 10:
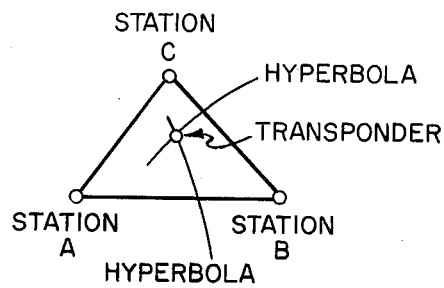
Figure 11:
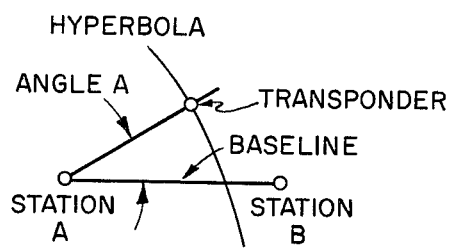

FIGS. 8, 9, 10 and 11 illustrate the various geometric relationships employed in the above mentioned methods for determining responding transponder position. FIG. 8 is useful in showing how range and azimuth of the transponder from one station locates the transponder equipped aircraft. In addition, the elevation angle of the aircraft together with range locates the aircraft in the Z or vertical coordinate also. As will be shown, azimuth and elevation angles are obtained from azimuth and elevation antennas and can be determined to quite close accuracies by monopulse techniques as known to those skilled in the art. FIG. 9 shows in two dimensions how a transponder is located when the azimuth of the transponder from two spaced apart stations is known. Of course, if the elevation angles of the transponder from the stations is also known then the location will be known in three dimensions. FIG. 10 shows the trilateration case where the distance from each of three stations to the transponder is known. Here the transponder lies at the intersection of two hyperbolas. In this case an interrogation message is transmitted from one station and the resulting reply received at at least three stations. The time intervals between the transmission of the interrogation message and the subsequent receipt of the reply at the various stations is determined. The hyperbolas are mathematically defined as:

$$r_1 \alpha \frac{t_C}{t_B}$$

$$r_2 \alpha \frac{t_A}{t_B}$$

where $t_A$, $t_B$ and $t_C$ are the time intervals as measured at stations A, B and C, respectively, between the transmission of the interrogation message and receipt of the reply. FIG. 11 shows the angle/bilateration case where the transponder is located at the intersection of a hyperbola and an azimuth line from one of the stations. The hyperbola is mathematically defined as:

$$r \alpha \frac{t_A}{t_B}$$

where $t_A$ and $t_B$ are as explained above.

It should be obvious that curves similar to those illustrated at FIG. 2 can be constructed for each geographical position or cell within the TCA for any particular siting and quantity of system stations. From these curves can be determined the optimum method for determining the position of any transponder equipped aircraft operating within the TCA merely by knowing the approximate position of the aircraft and then consulting the appropriate curve. It will be shown below that in accordance with the principles of this invention, that information related to the optimum method of determining the position of transponder equipped aircraft operating within the TCA is encoded into maps in the form of read only memories, wherein each cell of a memory corresponds to a particular geographical cell in the TCA and the information in the memory is thereafter obtained by addressing the memory in accordance with the approximate position of the aircraft, which approximate position is enrolled in a system memory and actually corresponds to the last obtained position information for the aircraft.

The interrogating stations will normally be commanded by a central control equipment from tracking information in a system memory as will be explained below, whereby they will interrogate aircraft in the TCA and at optimum rates to track them as they move within the TCA. Periodically the interrogating stations will be commanded to transmit search interrogations wherein the TCA is searched at a relatively low rate in order to acquire and enter into the system memory those aircraft entering the TCA. Normally, airspace search transmissions occur at a rate which will insure the interrogation and acquisition of every new target entering the TCA within some specified period (30 seconds has been assumed in this embodiment). The search interrogations are preferably sequenced at a regular rate to progress or scan in an angular sequence about the field of interest (TCA) with sufficient interrogation beam overlap to insure that no target will go undetected in a single scan. FIG. 3 shows how the search progresses. Specifically, station 16 searches through sector 16a, station 18 through sector 18a and station 20 through sector 20a. An overlapping of the sectors, as shown, is preferable to ensure that there are no gaps in the search pattern. The search may proceed sequentially with each station searching through its sector in turn, or with each station searching simultaneously. Simultaneous searching by all stations is, of course, possible only if some means is provided to prevent suppression of transponders in one sector by interrogations in another sector. It should also be understood that it is not necessary that the entire TCA be searched during a signal time block but that rather search interrogations can be interspersed with track interrogations to make optimum use of time and the available equipment.

It is preferable that the search be conducted by interrogations in mode 3/A. As known to those skilled in the aircraft transponder art, a mode 3/A interrogation elicits a reply which includes the assigned identity code of the responding aircraft. It is also preferable that search be conducted with a relatively wide, about 3° wide, beamwidth so as to ensure expedient and complete coverage of the TCA. A single reply permits a rough determination of aircraft position to be obtained by measurement of the azimuth angle at the interrogation station with range to the responding aircraft being roughly determined by considering the propagation time of the outbound interrogation message and the return propagation time of the resulting reply. After each search interrogation message a station will listen for about 600 microseconds, which is the time required to receive a reply from an aircraft at a range of sixty miles, since an aircraft previously unlisted in the system memory can be at any range within the TCA. With 600 microseconds being required for each search interrogation it can be seen that search interrogations can be scheduled at a rate as high as 1000 per second and that, if the entire TCA is searched in one time block, the search can be performed in about 0.25 seconds. However, as previously stated, normal search interrogations are interspersed with track interrogations of the type to be described below and are scheduled so that about 8 search interrogations are made per second. Thus, during a typical second of system time about 8 search interrogations will be made interspersed with a much larger number of track interrogations.

After an aircraft is listed in system memory it is tracked by interlacing mode 3/A interrogations with mode C interrogations from the interrogation stations. Of course, as explained immediately above, the track interrogations are also interspersed with search interrogations. As known, mode C interrogations elicit a response which provides the aircraft's altitude. In addition, during tracking the reply zone of the station is considerably narrowed to prevent the transponders lying at nearby angles from interfering with the addressed transponder's reply. Aircraft positions are tracked by known techniques using computer equipment and algorithms of the type well known to those in the art. In tracking it is important that the frequency of interrogation and the resulting updating of the track data of a particular aircraft be adaptive so as to increase as the distance from the airport decreases or as the aircraft approaches or threatens to conflict with an obstacle such as another aircraft. In addition, it is important that the position of the aircraft be determined in accordance with the best scheme available, and explained with respect to FIG. 2.

Figure 4:
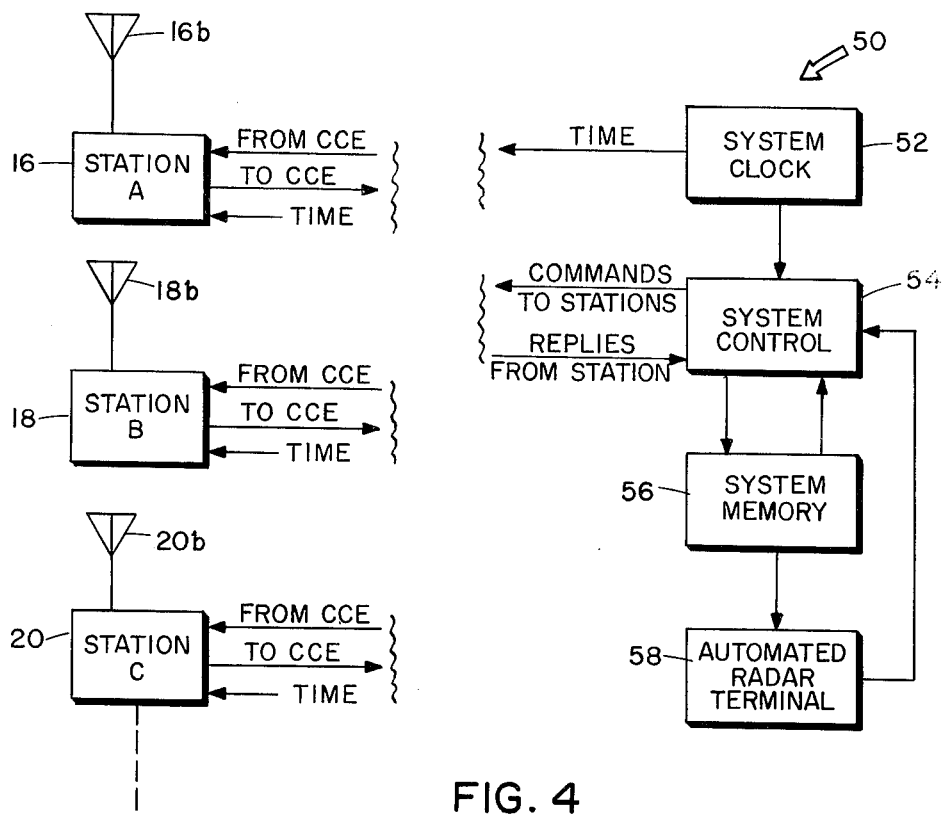
FIG. 4 is a block diagram of the invention.

Refer now to FIG. 4 which shows in block form a means for practicing this invention comprised of interrogating stations 16, 18 and 20, which are preferably located about the periphery of an aircraft as illustrated in FIG. 1, and central control equipment (CCE) 50 which can be located in some central location as in the airport control tower. It should be understood that more than three stations can comprise a system, three stations being shown as illustrative. The stations include directional antennas 16b, 18b and 20b, respectively. As previously noted, these antennas are preferably of the electronically steerable phased array type. The stations and the CCE communicate with one another, suitably via a microwave link. Any other appropriate type of communication link could be used, for example, communication could be effected via cable. The stations receive command communications from the CCE, which command communications are of three general types: commands directing the station to transmit a suppression or interrogation message and a command directing the station to receive a response. As will be made clear below, all three types of command communications are sent to the various stations while tracking or searching for aircraft on airfield 14 of FIG. 1, while generally only "transmit interrogations" and "receive responses" command communications are used when tracking or searching in approach area 12 and airspace 10 of FIG. 1. Each command communication will include pointing information for the selected station antenna whereby the antenna is pointed in the desired direction. When tracking aircraft the pointing information will direct the antenna to point in the direction of the aircraft from whose transponder a response is desired, while during search the pointing information will direct the antenna to point along the next azimuth line to be searched. Also included in each command communication is, with respect to "transmit" command communications, the exact time at which the transmission is to be sent and with respect to "receive" command communications the exact time period over which the station receiver is to be gated open to acquire the expected response. In addition to the information encoded in the command communication which identifies it as to type there is also preferably information encoded therein which instructs the station receiving the command communication to set the angular reply zone width of its antenna, the width being set relatively narrow when the station transmissions are for the purpose of tracking an aircraft and being set relatively wide when the station transmissions are for the purpose of searching the TCA.

Central control equipment 50 includes a system master clock 52, a system control unit 54, system memory 56 and optionally, an automated radar terminal system 58 of the type similar to the ARTS-111. System clock 52 is a source of time which is disseminated to the various stations of the system to maintain local station clocks in synchronism. Through the use of synchronized time the range between a responding aircraft at each station can be determined by means well known to those skilled in the art. In addition, if the terminal control area of the illustrated system overlaps the terminal control area of another system it is advantageous to synchronize the various clocks with one another to permit cooperation between the systems and also to avoid interference in the overlapping portions by interleaving their operations.

The system memory 56 is preferably of the random access solid state integrated circuit type and stores therein a listing of the aircraft operating within the TCA. This listing includes for each aircraft its identification code, its position with respect to a predetermined geographical grid, conveniently in $x$, $y$ and $z$ coordinates, and preferably its speed and direction of movement and whatever other information is appropriate such as last interrogation time and next scheduled interrogation time.

Automated radar terminal 58 continuously examines the contents of memory 56 and interrupts the standard system routine normally dictated by system control 54 whenever any of the aircraft listed in memory 56 appear to conflict with any other listed aircraft or are otherwise in a dangerous or potentially dangerous position so as to interrogate and update the positions of such aircraft at a higher than usual rate. Terminal 58 can also alert system personnel to the potentially dangerous situation. As previously mentioned, automated radar terminal 58 is suitably a type of equipment which is known to those skilled in the art as being able to perform the above described functions by examining the contents of a memory such as memory 56.

System control unit 54 controls the operation of the various stations by sending antenna beam pointing (address) information to the various stations, scheduling and timing the interrogations and considering responses received by the stations.

Figure 5:
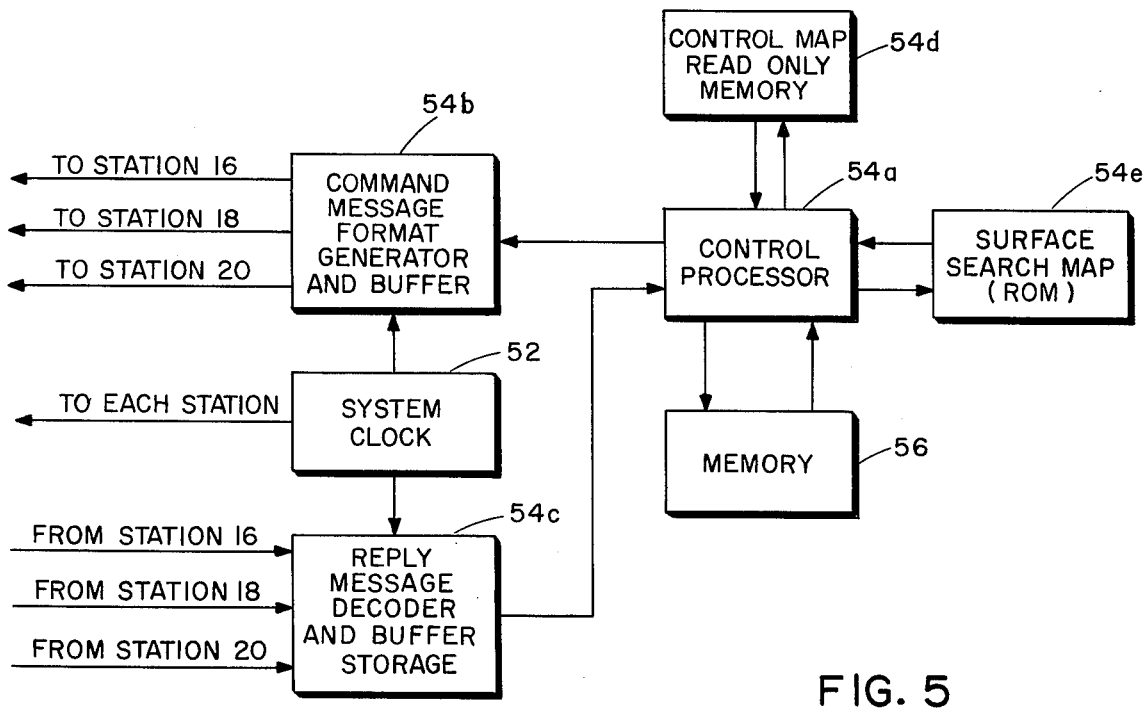
FIG. 5 is a block diagram of the central control equipment.

FIG. 5, reference to which should now be made, shows the central control equipment in greater detail. System control unit 54 is seen to be comprised of a control processor 54a, a command and message format generator and buffer 54b, reply message and buffer 54c, control map 54d and surface search map 54e. System clock 52 is seen to be supplying accurate time not only to generator 54b and decoder 54c, but also to each station to synchronize the clocks there.

Control processor 54a includes the basic logic and computational facilities of the system. For example, processor 54a includes a counter which accumulates clock pulses from system clock 52 and periodically schedules search interrogations. As previously mentioned, this results in one complete scan of the airspace approximately every 30 seconds according to the present embodiment. In the air space search mode, as explained with reference to FIG. 3, the stations are commanded in such a way as to produce a scan through 360° of azimuth. At other times the control processor commands the stations to search the airport ramps to acquire aircraft entering the taxi areas of the airport from the loading gate areas. How this latter airport ramp search is made is described in fuller detail below. Any aircraft responding to a search interrogation and not previously listed in memory 56 is enrolled therein. The purpose of searching through 360° of azimuth is to locate any unlisted airborne aircraft which have entered into the TCA at a 60 mile perimeter. The stations are commanded by control processor 54a during this search to make mode 3/A interrogations. This type of interrogation elicits a response which includes the identification of the interrogated aircraft. Also during the search the angular width of the reply zones is preferably increased since the purpose of the search is to identify any unlisted aircraft and determine its approximate location. Subsequently the aircraft's location will be determined more closely. A single reply to a search interrogation initiates a tentative track file in memory 56 so long as the aircraft identification elicited by the interrogation is not already listed therein. The tentative track file includes the aircraft identification code and its azimuth angle as measured at the receiving station.

A control map 54d is used in cooperation with control processor 54a. Map 54d is embodied here as a read only memory (ROM) which can be described with respect to FIG. 6, reference to which should now also be made. FIG. 6 is similar to FIG. 1 in showing an airport surface 14 expanded out of approach area 12 which in turn is expanded out of airspace 10. Each level is basically divided into a grid whose cell size is dependent upon the need to control system functions and to select computational methods in that area. For example, on the airport surface where the density of aircraft can be quite high and hence the need for precise precision information is relatively critical, the level is divided into approximately 1000 ft. square cells. The approach area is divided into approximately 6000 ft. square cells. In the airspace the cells are approximately 30,000 ft. square. It should be understood that each cell extends vertically from the ground to the maximum expected aircraft altitude in the present embodiment.

Map 54d of FIG. 5 includes a plurality of memory cells, each memory cell corresponding to one of the geographical cells of FIG. 6. Each cell of map 54d has encoded therein control information which identifies the station or stations which are to be used in interrogating any aircraft located in the corresponding geographical cell and also which station or stations are to be commanded to receive the resulting response. The information encoded in map 54d is originally calculated or derived by considering the effective viewing field of the various stations in light of the airport environment where ratio constrictions or obstacles in the field of interest can obscure part of a viewing field. In commanding the interrogation of aircraft listed in memory 56 control processor 54a consults the data stored in the cell of map 54d related to the geographical cell of FIG. 6 to which the interrogation is to be directed. In the case of aircraft listed in memory 56 the memory cell is selected in accordance with the target's listed x-y coordinates. By using the techniques described in the aforementioned U.S. Pat. No. 3,870,994 a single, small geographical cells on the airport surface or at relatively close range thereto can be interrogated. However, at relatively long ranges, as will be explained more fully below, all geographical cells lying in the same radial from the interrogating station as the cell being interrogated are also interrogated. This does not create any problem since aircraft separations normally increase with range from the airport and the reply zone width can be reduced to that angle which will tolerate the position uncertainties of the system.

It should at this time also be noted that for any particular airport and station siting situation, the method or scheme, for example those explained with respect to FIGS. 8–11, for determining the location of a responding aircraft to the best accuracy, is predetermined for each geographical cell. This information is thus also included in the memory cells of map 54d.

During normal tracking operation control processor 54a commands interrogations of each aircraft listed in memory 56 on a routine basis, commanding increasingly frequent interrogations as range to the aircraft decreases, as previously noted, periodically interspersing search interrogations in the remaining unused time to identify aircraft entering the TCA. During these operations it is necessary only that the interrogation be directed toward the position of the aircraft as recorded in memory 56. This is, the interrogation is directed toward the last known position of the aircraft. This is possible because interrogations regardless of aircraft range, are made sufficiently often that an aircraft cannot unpredictably move out of the interrogated area in the time between interrogations.

The azimuth angle of a responding aircraft is measured at the station receiving the response from the interrogated aircraft, suitably by monopulse techniques of the type known to those skilled in the art. Aircraft altitude is transmitted as one of the responses from the interrogated aircraft. The time at which a response is received is noted so that slant range to the aircraft can be determined. As will be explained, the information obtained by the interrogation and subsequent reply is made up into a communication message at the receiving station and relayed to the reply message decoder 54c. There is thus available at decoder 54c upon receipt of a reply all the information required to determine the position of the responding aircraft. As aforementioned, this position information includes the x–y–z coordinates of the aircraft with respect to a predetermined geographical point or measurement grid system. This information is entered through processor 54a into memory 56, displacing the position information formerly memorized. In addition, by comparing the displaced coordinates with the latest coordinates in processor 54a the speed, direction and altitude rate of the aircraft can be determined and enrolled in memory 56. It is also desirable to memorize aircraft identity and altitude, both of which pieces of information are included in the various aircraft responses. Altitude information is particularly useful in making collision avoidance decisions of the type which might be made by terminal 58 of FIG. 4.

Refer now to FIG. 7 which shows a typical station such as station 16 of FIG. 4 and which includes an electronically steerable antenna comprised of an azimuth array 60 and an elevation angle measurement interferometer array 62. In this embodiment, transmissions, which may be interrogation or suppression messages, are radiated in a vertically oriented fan beam from array 60 while responses are received at array 60 in accordance with aircraft azimuth and the same responses are received at array 62 in accordance with aircraft elevation.

Command communications are received at command communication decoder and distributor 64 from the central control equipment of FIG. 4. As previously mentioned command communications direct the station to either transmit a message or receive a response. A transmit command communication directs the selected station to steer array 60 to the proper azimuth and to transmit a message at the commanded time. The message commanded can either be a positive type interrogation of the type transmitted according to the air traffic control system and which elicits responses from a receiving aircraft (ATCRBS message) or it may be a suppression type wherein all aircraft in the receiving field of interest are suppressed for 35 ± 10 microseconds except for aircraft within the narrow antenna beam. This type of interrogation was explained above at length and in the aforementioned U.S. Pat. No. 3,870,994.

System time is also received at decoder 64, from system master clock 52 of FIG. 4, to maintain local clock 66 synchronized. Means for synchronizing a local slave clock to a remote master clock are well known in the art and need not be repeated here.

Transmit command communications are preferably comprised of a serial train of binary bits which include therein the following information: antenna steering information; message format information, that is, whether the message is to be an interrogation or a suppression; time at which the message is to be transmitted (command time); transmitter power; and, relative $P_1$ and $P_2$ pulse power levels (which controls reply zone angular width). Other information can be included at the option of the system designer.

Antenna steering and reply zone width information is decoded by command message decoder and distributor 64 and applied to steer the antenna and set the reply zone width. Command time is compared against local time as maintained by local clock 66 and transmitter 68 is triggered at the proper time to transmit the commanded message via antenna 60 in accordance with the message format information. It should be understood that since the interrogation messages during tracking operation are being directed at known targets at known ranges from the station that the expected time of arrival of a resulting reply at the station can be accurately estimated. In addition, the time required to make a particular interrogation, which includes decoding the command communication and steering the antenna is much shorter than the time between the transmittal of an interrogation message and the receipt of a reply, at least for remote targets. It is thus possible for a station to be commanded by the CCE to transmit a number of interrogation messages consecutively and then be commanded to go back to listen for the expected replies. For this reason a separate response command communication is sent from the CCE to the station distributor 64. The response command communication is similar to the interrogation command communication with, optionally, the addition of elevation information which is decoded to steer elevation antenna 62. The response command communication also includes the gate time, that is, the time during which the reply is expected. The gate time is decoded by decoder 64 and compared with the time kept by local clock 66 to gate open elevation receiver 70 and azimuth receiver 72 at the appropriate time.

A reply received at antennas 60 and 62 is processed and decoded, respectively, by azimuth receiver 72 and elevation receiver 70. Receivers 70 and 72 also receive steering information from distributor 64 which is used to position the receive beam so that monopulse techniques can be utilized on the respective replies to measure the error between the commanded position and the actual angle of arrival of the signal energy. Information defining the target azimuth and elevation angles (that is the command angles ± the monopulse measurement for each) is applied to encoder 74 together with the reply information, (target identification or altitude depending on the type of interrogation), together with information defining the time of receipt of the reply, which time is obtained from local clock 66. Encoder 74 formulates a communication message which includes this information and which is sent back to the CCE. This communication is similar to command communication messages sent from the CCE to the stations.

Figure 12:
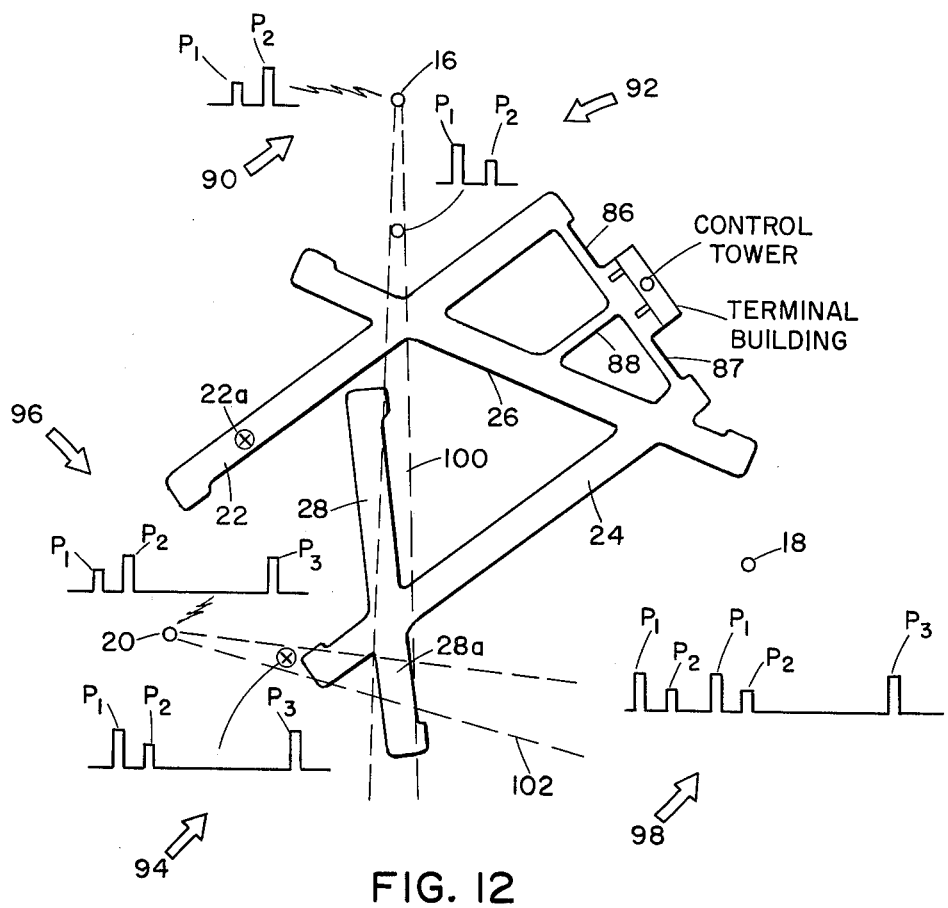
FIG. 12 shows an airport surface and illustrates how it can be divided into geographical cells in accordance with the principles of this invention.

It was previously described how a search about the periphery of the TCA is made to identify aircraft entering therein. Search must also periodically be made of the airport surface to ensure that all aircraft maneuvering thereon are enrolled in the system memory. Since aircraft density on the surface of the airport in relatively high searches of the airport surface are made at fairly frequent intervals and in accordance with the interrogation techniques previously described with respect to U.S. Pat. No. 3,870,994. These techniques are also described with respect to FIG. 12, reference to which figure should now be made. FIG. 12 shows the airport surface first seen in FIG. 1 but on an enlarged scale. Included are the control tower and terminal building and stations 16, 18 and 20, also previously seen in FIG. 1. Four runways, as before, are numbered 22, 24, 26 and 28. Stations 16 and 20 are seen cooperating to interrogate a small geographical cell 28a which comprises a portion of runway 28. For example, station 16 transmits an omnidirectional message, herein termed the suppression message, which is illustrated at 90 as pulses $P_1$ and $P_2$ of the type previously described, wherein pulse $P_1$ will be received at a lower amplitude than pulse $P_2$ everywhere except in a narrow beam 100 radiating from station 16, wherein pulse $P_1$ will be received at a higher amplitude than pulse $P_2$ as illustrated at 92. Subsequently, station 20 transmits the standard ATCRBS message which as known to those skilled in the art is comprised of pulses $P_1$, $P_2$ and $P_3$ along a narrow beam, for example beam 102, radiating from station 20 within which pulses $P_1$ and $P_3$ are received at higher amplitude than pulse $P_2$ and outside of which pulse $P_2$ is received at a higher amplitude than pulses $P_1$ and $P_3$ as illustrated, respectively, at 94 and 96. An aircraft maneuvering within geographic cell 28a will receive the composite message illustrated in 98, wherein the first $P_1$ and $P_2$ pulses are received from station 16 and have no effect upon the aircraft transponder and the subsequent pulses $P_1$, $P_2$ and $P_3$ cause the aircraft transponder to reply.

It should be obvious that it is preferable that the beams from the various stations while interrogating specific geographic cells on the airport surface be as close to orthogonal as possible. Therefore, stations 18 and 20 will preferably cooperate in interrogating an aircraft maneuvering at a point such as 22a. It should be understood that in tracking aircraft on the airport surface the control map 54d of FIG. 5, reference to which figure should also now be made, is used in accordance with the x-y coordinates of the aircraft as listed in memory 56 to determine which stations are to interrogate the aircraft.

In searching the airport surface for aircraft entering the active portions thereof from, for example, the loading ramps via aprons 86, 87 and 88, a simple sequential search such as illustrated at FIG. 3 for searching the airspace will elicit many and possibly interfering responses due to the expected high density of aircraft on the airport surface. It is thus preferable to perform searches of the airport surface in an orderly manner through specific geographic cells rather than along an entire azimuth as is done in the search illustrated in FIG. 3. To perform this orderly surface search the surface search map 54e of FIG. 5 is used. Map 54e like map 54d is preferably a read only memory wherein each cell corresponds to a particular geographic cell on the airport surface and which has encoded therein the information required by the various stations to interrogate that particular geographic cell. The information in each cell will include, for example, which stations are to perform the interrogation: which selected station is to transmit the suppression message and which is to transmit the interrogation message, the time of transmittal of each of the above mentioned messages and which stations are to receive a response if any is elicited.

It should now be clear that the system herein described is versatile and flexible and subject to various modifications and alterations without departing from the scope of the invention. For example, it is desirable to observe and update the information in memory 56 of FIG. 5 on aircraft in certain areas of the TCA more often than others, that is, it is desirable to interrogate those aircraft at more frequent intervals. These areas of the airspace can be predetermined and include, for example, the landing approach zones. This can be accomplished by encoding in map 54d of FIG. 5 information which identifies the cell as requiring more frequent interrogation. As an alternative the aircraft identification as listed in memory 56 can have a special pointer applied thereto when its coordinates or other criteria indicates that it should be interrogated at other than normal intervals. It should also be noted at this time that by judicious siting of the various stations it is possible to "look around" an obstacle, such as a high rise building, which might otherwise obscure a portion of the TCA. In this case the use of a map such as map 54d of FIG. 5 permits a first or group of stations to be assigned to monitor aircraft in one portion of the TCA behind the obstacle which is visible from the first station, while another station or group of stations is assigned to monitor the space behind the obstacle that is not visible from the first station or group of stations. Other alterations and modifications should now also be obvious to one skilled in the art from a reading and understanding of the above description of the invention. Accordingly, the invention is to be limited to the true spirit and scope of the appended claims.

The invention claimed is:

1. An airport terminal area surveillance system comprised of a plurality of spaced apart interrogating and receiving stations having steerable antennas for directing an interrogation message along a relatively narrow beam radiated from said stations and for receiving replies from unsuppressed transponders illuminated by said beam, said replies being coded with information related to the identity or altitude of said transponders and including means responsive to said interrogations and resulting replies for determining the location of the replying transponder, said system including means for determining which of said stations is to direct an interrogation message to a particular transponder and which of said stations is to receive the resulting reply in accordance with the transponder location.

2. The system of claim 1 including clock means for timing the interval between the transmission of an interrogation message and the receipt of an associated reply thereto at said stations, said interval being a measure of the range between said stations and the replying transponder, and wherein the measured azimuth angle of said replying transponder from an antenna receiving the reply is related to the pointing angle of said antenna, the location of said replying transponder being a function of at least one of said range and said azimuth angle.

3. The system of claim 2 including memory means for recording the location of each transponder replying to interrogation messages, said means for determining being responsive to the location of a transponder as recorded in said memory means for determining which station is to direct a subsequent interrogation message to that transponder and which station is to receive the resulting reply.

4. A surveillance system for an airport terminal control area including a plurality of spaced apart interrogating and receiving stations and wherein transponder equipped aircraft cooperate with said stations, said stations being able to direct an interrogation message into a selected portion of said terminal control area and determine the location of a transponder equipped aircraft which receives said interrogation message and replies thereto and additionally including memory means for recording information defining the location of each said transponder equipped aircraft operating within said terminal control area and replying to interrogations, and means responsive to information defining the location of a transponder equipped aircraft to be interrogated for selecting which of said stations is to direct an interrogation message to that portion of said terminal control area in which said transponder equipped aircraft is located.

5. A surveillance system for an airport terminal control area including a plurality of spaced apart interrogating and receiving stations and wherein transponder equipped aircraft cooperate with said stations, said stations being able to direct an interrogation message into a selected portion of said terminal control area and determine, in response to a reply to said interrogation message, the location of a transponder equipped aircraft which replies to said interrogation message by any of a plurality of algorithms for determining location in response to a reply to an interrogation and additionally including means for recording the location of said transponder equipped aircraft which replies to said interrogation message; and, means responsive to the recorded location for selecting which of said plurality of algorithms is to be used for determining the location of said aircraft in response to a subsequent reply.

6. The method of locating transponder equipped aircraft operating within an airport terminal control area wherein an aircraft receiving an interrogation message transmits a reply a predetermined time after receipt of said message comprising:

transmitting an interrogation message from at least one of a plurality of fixed, spaced apart stations to the location of an aircraft in accordance with information as to said location as recorded in a memory means;

selecting, in accordance with information as to said location as recorded in said memory means, an algorithm for determining the new location of said aircraft from among a plurality of algorithms for determining the location of aircraft;

selecting the station to transmit said interrogation message in accordance with information as to said location as recorded in said memory means; and, recording said new location in said memory means.

7. The method of claim 6 wherein the selected algorithm includes at least one of the following: calculating said new location given the range and direction of said aircraft from one of said stations; calculating said new location given the distance from said aircraft to at least three of said stations; and, calculating said new location given the distance from said aircraft to at least two of said stations and the direction of said aircraft from at least one of said stations; said method additionally including selecting one of the following steps in accordance with information as to said location as recorded in said memory means; causing one station to receive said reply, determining the direction from which said reply emanated, and timing the time interval between the transmission of said interrogation message and the receipt of said reply at said one station; causing at least two stations to receive said reply and determining the direction with respect to each of said at least two stations from which said reply emanated; causing at least two stations to receive said reply and determining the direction with respect to one said station from which said reply emanated and timing the time interval between the transmission of said interrogation message and receipt of the reply at one of said at least two stations; and, causing at least three stations to receive said reply and timing the time intervals between the transmission of said interrogation message and the receipt of the reply at said at least three stations.

* * * * *